(12) United States Patent
Hon et al.

(10) Patent No.: US 9,264,478 B2
(45) Date of Patent: Feb. 16, 2016

(54) HOME CLOUD WITH VIRTUALIZED INPUT AND OUTPUT ROAMING OVER NETWORK

(71) Applicant: Microsoft Technology Licensing, LLC, Redmond, WA (US)

(72) Inventors: Hsiao-Wuen Hon, Bellevue, WA (US); Shipeng Li, Palo Alto, CA (US); Yan Lu, Beijing (CN); Huifeng Shen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 371 days.

(21) Appl. No.: 13/663,720

(22) Filed: Oct. 30, 2012

(65) Prior Publication Data

US 2014/0122729 A1    May 1, 2014

(51) Int. Cl.
*H04L 29/08* (2006.01)
*H04L 29/06* (2006.01)
*H04N 1/00* (2006.01)
*H04L 12/28* (2006.01)

(52) U.S. Cl.
CPC ............ *H04L 67/04* (2013.01); *H04L 65/4069* (2013.01); *H04L 67/12* (2013.01); *H04N 1/00127* (2013.01); *H04N 1/00244* (2013.01); *H04L 12/281* (2013.01); *H04L 12/282* (2013.01); *H04L 12/2809* (2013.01); *H04L 12/2832* (2013.01); *H04L 2012/2849* (2013.01)

(58) Field of Classification Search
CPC .......... H04N 1/00127; H04N 1/00132; H04N 1/00204; H04N 1/00236; H04N 1/00244; H04L 67/04; H04L 67/12; H04L 67/18; H04L 67/28; H04L 65/4069

USPC .................. 709/203, 217, 223, 227, 228, 231
See application file for complete search history.

(56) References Cited

U.S. PATENT DOCUMENTS

| 6,246,688 | B1 * | 6/2001 | Angwin et al. ............... 370/401 |
| 6,651,252 | B1 | 11/2003 | Gordon et al. |
| 7,275,037 | B2 * | 9/2007 | Lauer ............................. 345/418 |
| 7,590,998 | B2 | 9/2009 | Hanley |
| 8,036,125 | B2 * | 10/2011 | Pozhenko et al. ............. 370/235 |
| 8,146,124 | B2 * | 3/2012 | Kitagawa ....................... 725/105 |
| 8,259,186 | B2 * | 9/2012 | Kiyoshige ................ 348/211.99 |

(Continued)

FOREIGN PATENT DOCUMENTS

| EP | 1330098 A1 | 7/2003 |
| WO | WO2004088543 A1 | 10/2004 |

OTHER PUBLICATIONS

Office action for U.S. Appl. No. 13/087,923, mailed on Mar. 1, 2013, Shen et al., "Using a Proxy Server for a Mobile Browser," 11 pages.

(Continued)

*Primary Examiner* — Ramy M Osman
(74) *Attorney, Agent, or Firm* — Sandy Swain; Micky Minhas; Lee & Hayes PLLC (57) ABSTRACT

A home cloud computing system employs a virtualization system to virtualize data of a device and adaptively transform type or format of the virtualized data for one or more other devices, thus leveraging resources of the device for the one or more other devices. Through data virtualization and adaptive transformation, devices of heterogeneous types are seamlessly connected to one another and can act as input or output devices for each other to create a home cloud network of devices.

18 Claims, 4 Drawing Sheets

(56) References Cited

U.S. PATENT DOCUMENTS

| | | | |
|---|---|---|---|
| 8,533,613 | B2 | 9/2013 | Yu |
| 8,854,484 | B2* | 10/2014 | Takagi ........................ 348/211.3 |
| 2003/0043272 | A1* | 3/2003 | Nagao et al. ............... 348/207.1 |
| 2003/0056220 | A1* | 3/2003 | Thornton et al. ............... 725/62 |
| 2003/0195963 | A1 | 10/2003 | Song et al. |
| 2006/0189349 | A1* | 8/2006 | Montulli et al. ........... 455/556.1 |
| 2007/0198716 | A1 | 8/2007 | Knowles et al. |
| 2007/0209056 | A1* | 9/2007 | Mayuzumi ..................... 725/105 |
| 2007/0288855 | A1 | 12/2007 | Rohrabaugh et al. |
| 2008/0119223 | A1* | 5/2008 | Tsunoda .................... 455/556.1 |
| 2008/0151058 | A1* | 6/2008 | Xu et al. ..................... 348/207.1 |
| 2008/0254778 | A1 | 10/2008 | Kim |
| 2009/0006639 | A1* | 1/2009 | Robbins ........................ 709/231 |
| 2009/0083646 | A1 | 3/2009 | Lin et al. |
| 2009/0320073 | A1 | 12/2009 | Reisman |
| 2010/0050089 | A1 | 2/2010 | Kim et al. |
| 2010/0134338 | A1 | 6/2010 | Belz et al. |
| 2010/0169945 | A1 | 7/2010 | Kennedy et al. |
| 2010/0245681 | A1 | 9/2010 | Harris |
| 2010/0332565 | A1 | 12/2010 | Al-Shaykh et al. |
| 2011/0106520 | A1* | 5/2011 | Emerson et al. .............. 709/223 |
| 2011/0131520 | A1 | 6/2011 | Al-Shaykh et al. |
| 2011/0219105 | A1 | 9/2011 | Kryze et al. |
| 2012/0054616 | A1 | 3/2012 | Mittal |
| 2012/0179746 | A1* | 7/2012 | Bolgert et al. ................. 709/203 |
| 2012/0210205 | A1 | 8/2012 | Sherwood et al. |
| 2013/0072120 | A1* | 3/2013 | Wu ............................... 455/41.2 |
| 2013/0125014 | A1 | 5/2013 | Sharif-Ahmadi et al. |
| 2013/0222419 | A1* | 8/2013 | Rosenberg .................... 345/629 |
| 2014/0053054 | A1 | 2/2014 | Shen et al. |

OTHER PUBLICATIONS

U.S. Appl. No. 12/340,410, filed Dec. 19, 2008, Yan Lu, Huifeng Shen, Feng Wu, Shipeng Li, "Accelerated Screen Codec," published Jun. 24, 2010 , US Patent Publication 2010/0158400, 37 pages.

U.S. Appl. No. 12/408,611, filed Mar. 20, 2009, Yan Lu, Feng Wu, Shipeng Li, Huifeng Shen, "Remote Computing Platforms Providing High-Fidelity Display and Interactivity for Clients," published May 6, 2010, US Patent Publication 2010/0111410, 48 pages.

U.S. Appl. No. 13/087,923, filed Apr. 15, 2011, Huifeng Shen, Zhaotai Pan, Yan Lu, Shipeng Li, Haicheng Sun, "Using a Proxy Server for a Mobile Browser," 42 pages.

U.S. Appl. No. 13/094,725, filed Apr. 26, 2011, Yan Lu, Shipeng Li, Wen Sun, "Interactive Virtual Display System for Ubiquitous Devices," published Aug. 18, 2011, US Patent Publication 2011/0199389, 48 pages.

U.S. Appl. No. 13/585,185, filed Aug. 14, 2012, Huifeng Shen, Shipeng Li, Yan Lu, Zhaotai Pan, and Jianfeng Wang "Cooperative Web Browsing Using Multiple Devices," 40 pages.

Almeroth et al., "A lightweight protocol for interconnecting heterogeneous devices in dynamic environments," Published Jul. 1999, In IEEE Conference on International Multimedia Computing and Systems, vol. 2, retrieved at <<http://ieeexplore.ieee.org/stamp/stamp.jsp?tp=&arnumber=778477>>, pp. 420-425.

Baratto et al., "THINC: A Remote Display Architecture for Thin-Client Computing," Department of Computer Science Columbia University Technical Report CUCS-027-04, Jul. 2004, 15 pages.

Bournique, "Bolt Browser Review/Wap Review," retrieved at <<http://wapreview.com/blog/?p=2598>>, Jan. 17, 2009, 9 pages.

Bournique, "Browser Comparison—TeaShark vs Opera," retrieved at <<http://wapreview.com/blog/?p=858>>, Aug. 25, 2008, 9 pages.

Bournique, "Official English UCWEB 7.0 Browser Reviewed—Great Feature Set But Many Sites Fail to Load," retrieved at <<http://wapreview.com/blog/?p=5992>>, Dec. 30, 2009, 9 pages.

Canfora et al., "Migrating Web Application Sessions in Mobile Computing," in Special interest tracks and posters of the 14th international conference on World Wide Web, ser. WWW 05. New York, NY, USA: ACM, 2005, retrieved at <<http://doi.acm.org/10.1145/1062745.1062921>>, pp. 1166-1167.

"Firefox Home—looking to the future," retrieved at <<http://blog.mozilla.com/mobile/2010/09/28/firefox-home-looking-to-the-future/>>, Posted by ragavan, Sep. 28, 2010, 11 pages.

Goergen et al., "A session model for cross-domain interactive multi-user IPTV," published Jan. 9, 2010, Consumer Communications and Networking Conference (CCNC), 2010, 7th IEEE, retrieved at <<http://ieeexplore.ieee.org/stamp/stamp.jsp?arnumber=05421792>>, pp. 1-6.

Hesselman et al., "An Open Service Infrastructure for Enhancing Interactive TV Experiences," published Jul. 2008, In Workshop on Sharing Content and Experiences with Social Interactive Television, retrieved at <<http://mmi.tudelft.nl/oostb/files/Hesselman%20et%20al%202008%20EuroITV08.pdf>>, 2 pages.

Hesselman et al., "Sharing Enriched Multimedia Experiences across Heterogeneous Network Infrastructures," Published Jun. 2010, In Communications Magazine, IEEE, vol. 48, Issue 6, retrieved at <<http://ieeexplore.ieee.org/stamp/stamp.jsp?tp=&arnumber=5473865>>, pp. 54-65.

Hua et al., "A Cooperative Framework for Information Browsing in Mobile Environment," retrieved on Mar. 26, 2012 at <<http://www.irma-international.org/viewtitle/26524/>>, 3 pages.

Kim et al., "pTHINC: A Thin-Client Architecture for Mobile Wireless Web," International World Wide Web Conference, May 23-26, 2006, 10 pages.

Kim et al., "Streaming Session Mobility across Multiple Devices in Mobile IPTV Environments," Ubiquitous Information Technologies & Applications, 2009. ICUT 09, published Dec. 20, 2009, retrieved from <<http://ieeexplore.ieee.org/stamp/stamp.jsp?arnumber=05405714>>, pp. 1-6.

"Opera Mini and Opera Mobile," retrieved on Nov. 24, 2010 at <<http://www.opera.com/mobile/>>, 1 page.

Potter et al., "Webpod: persistent web browsing sessions with pocketable storage devices," in Proceedings of the 14th international conference on World Wide Web, ser. WWW 05. New York, NY, USA: ACM, 2005, retrieved at <<http://doi.acm.org/10.1145/1060745.1060833>>, pp. 603-612.

Products—Skyfire, "Now there's a Smart Browser for Smart phones," retrieved on Nov. 24, 2010 at <<http://www.skyfire.com/product>>, Sky fire Labs, Inc., 1 page.

"Review: Thunderhawk—PDAPhoneHome," retrieved at <<http://pdaphonehome.com/forums/articles/7538-review-thunderhawk.html>>, Published by outlookchick, Jul. 9, 2003, 3 pages.

Russell et al., "The future of integrated design of ubiquitous computing in combined real & virtual worlds," published Apr. 18, 1998, CHI 98 Conference summary on Human factors in computing systems, retrieved at <<http://web.archive.org/web/20051024110148/http://mami.uclm.es/jbravo/docencia/doctorado/Fundamentos-Weiser/UC_combined_real_and_virtual.pdf>>, pp. 275-276.

Schwarz et al., "Overview of the Scalable Video Coding Extension of the H.264/AVC Standard," Circuits and Systems for Video Technology, IEEE Transactions on, 2007, retrieved at <<http://ieeexplore.ieee.org/stamp/stamp.jsp?tp=&arnumber=4317636>>, pp. 1103-1120.

Shen et al., "A High-Performance Remote Computing Platform," in PerCom Workshops, 2009, A High-Performance Remote Computing Platform, retrieved at <<http://ieeexplore.ieee.org/stamp/stamp.jsp?tp=&arnumber=4912855>>, 6 pages.

Skyfire Labs, "Skyfire mobile web browser," retrieved at <<http://www.skyfire.com/en/for-consumers/products,>>, 2009, 4 pages.

Song et al., "Browser Session Preservation and Migration," In Poster Session of WWW 2002, Hawai, retrieved at <<http://wwwconference.org/www2002/CDROM/poster/80.pdf>>, 2 pages.

Wallace et al., "Virtually shared displays and user input devices," published Jun. 20, 2007, ATC 07, 2007 USENIX Annual Technical Conference on Proceedings of the USENIX Annual Technical Conference, retrieved at <<http://www.cs.princeton.edu/gwallace/papers/virtually-shared-displays.pdf>>, 6 pages.

Canfora et al., "Proxy-based Hand-off of Web Sessions for User Mobility," The Second Annual International Conference on Mobile and Ubiquitous Systems: Networking and Services, Jul. 17-21, 2005, Piscataway, NJ, USA, IEEE, Los Alamitos, CA, pp. 363-372.

(56) References Cited

OTHER PUBLICATIONS

Komiya et al., "Use Cases for Session Mobility in Multimedia Applications: draft-komiya-mmusic-session-mobility-usecases-00.txt," Feb. 27, 2006, 11 pages.

Mate et al., "Movable-Multimedia: Session Mobility in Ubiquitous Computing Ecosystem," Proceedings of the 5th International Conference on Mobile and Ubiquitous Multimedia, Dec. 4, 2006, retrieved on Oct. 2, 2012 at <<http://dl.acm.org/citation.cfm?doid=1186655.1186663>> 5 pages.

Office action for U.S. Appl. No. 13/087,923, mailed on Spetember 27, 2013, Shen et al., "Using a Proxy Server for a Mobile Browser," 12 pages.

"International Search Report & Written Opinion for PCT Patent Application No. PCT/US2013/066473," Mailed Date: Jan. 8, 2014, Filed Date: Oct. 24, 2013, 14 Pages.

Sung et al., "UPnP Based Intelligent Multimedia Service Architecture for Digital Home Network," In the Fourth IEEE Workshop on Software Technologies for Future Embedded and Ubiquitous Systems, and the Second International Workshop on Collaborative Computing, Integration, and Assurance, Apr. 27, 2006, pp. 157-162.

U.S. Appl. No. 13/663,720, filed Oct. 30, 2012, Hsiao-Wuen Hon, Shipeng Li, Yan Lu, Huifeng Shen, "Home Cloud With Virtualized Input and Output Roaming Over Network," 55 pages.

The PCT Search Report mailed Oct. 25, 2013 for PCT application No. PCT/US2013/053538 , 16 pages.

Office Action for U.S. Appl. No. 13/585,185, mailed on Oct. 23, 2014, Huifeng Shen, "Cooperative Web Browsing Using Multiple Devices", 22 pages.

Office action for U.S. Appl. No. 13/585,185, mailed on Apr. 28, 2015, Shen et al., "Cooperative Web Browsing Using Multiple Devices," 25 pages.

\* cited by examiner

HOME CLOUD WITH VIRTUALIZED INPUT AND OUTPUT ROAMING OVER NETWORK

BACKGROUND

The development of new computing technologies brings unprecedented experience to people's daily lives. Among the newly developed technologies, new human-computer interaction (HCI) technologies have become a driving force and a determining factor of success for today's home entertainment. Different from conventional user interfaces which include physical keyboards and mice, more natural user interfaces (NUI), such as user touch, gesture, voice, etc., are proposed and developed for user interaction with a variety of computing devices which include televisions, game consoles, desktop computers, tablets, smart phones, to name a few. Although significant developments have been made so far, computing capabilities and NUI functions are still confined to respective devices, platforms or applications, and cannot be shared with other devices, platforms or applications due to diverse and incompatible input and output data formats of different computing devices, for example.

SUMMARY

This summary introduces simplified concepts of home cloud computing, which are further described below in the Detailed Description. This summary is not intended to identify essential features of the claimed subject matter, nor is it intended for use in limiting the scope of the claimed subject matter.

This application describes example embodiments of home cloud computing. In one embodiment, a first device may virtualize data (such as input and output data) thereof and redirect part or all of the virtualized data to one or more other devices to leverage resources of the first device for the one or more other devices.

In one embodiment, the first device may detect a presence of a second device in a proximity of the first device. In response to detecting the presence of the second device, the first device may establish a network or data connection with the second device. Additionally, the first device may further determine functional capabilities (such as data processing capabilities, display capabilities, etc.) of the second device.

In some embodiments, the first device may negotiate with the second device with respect to one or more responsibilities. For example, the first device may negotiate with the second device regarding an extent of data transformation that is to be performed by the first device for the second device and an extent of data transformation that is to be performed by the second device for the first device based on the functional capabilities of the second device and functional capabilities of the first device.

The first device may virtualize its data (input and/or output data) into virtualized data. Upon virtualizing the data, the first device may transform the virtualized data into a virtualized data stream (e.g., in a virtualization interconnection layer that is on top of a data network layer) based on a result of the negotiation between the first device and the second device. The first device may send the virtualized data stream to the second device, thus leveraging resources of the first device for the second device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, existing computing capabilities and NUI functions are confined to respective devices, platforms or applications, and cannot be shared with other devices, platforms or applications due to, for example, diverse and incompatible input and output data formats and complexities of different computing devices.

This disclosure describes a home cloud computing system. The home cloud computing system employs a virtualization system to leverage resources of a plurality of devices by virtualizing respective inputs and outputs, and enables communication and interpretation of the inputs and the outputs among and across the plurality of devices regardless of input and/or output capabilities, types, formats and/or complexities of the plurality of devices. Furthermore, the virtualization system allows composing all or parts of different inputs and/or outputs from different devices to form a combined input or output that may be manipulated and/or presented in one or more devices.

In one embodiment, the virtualization system may be included or installed in a device that interacts with a user, i.e., a device that receives inputs from the user and/or presents outputs to the user. The virtualization system enables the device to share or redirect resources thereof, such as data processing and display capabilities, without specifying a particular device beforehand. The virtualization system also allows the device to adapt to a particular device during and/or after establishing a network connection with that particular device. The virtualization system leverages resources by virtualizing input and/or output data of the device. Examples of virtualization may include, but are not limited to, generating output data (e.g., screen data) with or without presenting the output data locally at the device, capturing input data through a user interface of the device with or without processing the input data and/or providing a response with respect to the input data locally, etc.

After virtualizing the data of the device, in some embodiments, the virtualization system may redirect part or all of the input data and/or the output data of the device to one or more other devices through a network for data presentation and/or processing.

In other embodiments, due to the heterogeneous nature of data types, formats and/or complexities of different devices, for example, the virtualization system may pre-process the data of the device prior to sending the data to the one or more other devices. For instance, a virtualization system of a first device may have negotiated with a second device (or a virtualization system of the second device) an extent of data transformation (for example, data pre-processing, encoding, etc.) that the first device may perform for the second device and/or an extent of data transformation that the second device may perform for the first device when establishing a network or data connection between the first device and the second device. The first device may pre-process and encode the data in accordance with a result of the negotiation, and send the pre-processed/encoded data to the second device thereafter.

The described home cloud computing system enables interaction among a plurality of devices that may have diverse input and output capabilities, types and formats, and leverages resources of the plurality of devices through input and output virtualization.

In some of the examples described herein, the virtualization system virtualizes input and output data of a device, establishes or facilitates a network connection with another device for the device, negotiates respective degrees of data transformation to be done by each device, transforms the data of the device, and sends the data to the other device and/or receive data from the other device. However, in other embodiments, these functions may be performed by multiple separate systems or services. For example, in one embodiment, a virtualization service may virtualize data of the device, while a separate service may establish a network connection with other device and negotiate respective degrees of data transformation to be performed by each device, and yet another service may transform the data of the device and send the data to the other device and/or receive data from the other device.

Furthermore, although in the examples described herein, the virtualization system may be implemented as software and/or hardware installed in a device, in other embodiments, the virtualization system may be implemented as a separate entity or device that is peripheral or attached to the device. Furthermore, in some embodiments, the virtualization system may be implemented as software and/or hardware included in one or more other devices forming a network through which each device of the plurality of devices connects to one another (e.g., a local server or router, etc.). Additionally or alternatively, the virtualization system may be implemented as a service provided in one or more servers over the network and/or in a cloud computing architecture.

The application describes multiple and varied implementations and embodiments. The following section describes an example environment that is suitable for practicing various implementations. Next, the application describes example systems, devices, and processes for implementing a home cloud computing system.

Exemplary Environment

Figure 1:
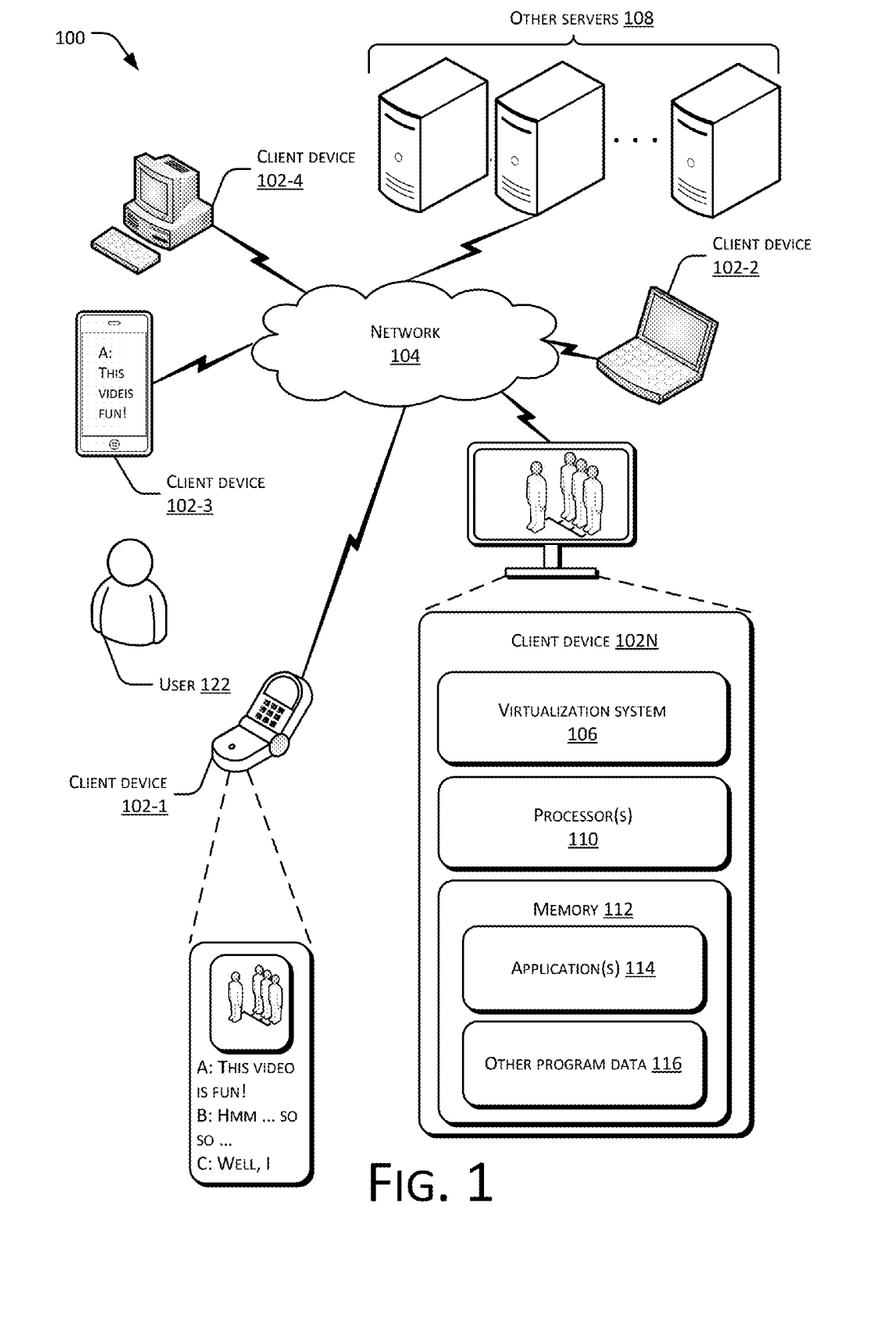
FIG. 1 illustrates an example environment including a home cloud computing system.

FIG. 1 illustrates an exemplary environment 100 that implements a home cloud computing system. The environment 100 may include a plurality of client devices 102-1, 102-2, 102-3, 102-4, . . . , 102-N (which are collectively referred to as client devices 102) and a network 104. In this example, each of the plurality of client devices 102 may be installed or attached with a virtualization system 106. The plurality of client devices 102 may communicate data with one another through respective virtualization systems 106 via the network 104.

Although in this example, each client device 102 is described to install or attach with a respective virtualization system 106, in some embodiments, some or all of the functions of the virtualization system 106 may be included in one or more entities other than the client devices 102. For example, some or all of the functions of the virtualization system 106 may be included and distributed in the client device 102 and a separate device that is peripheral to the client device 102 (e.g., a peripheral device, a set-top box, etc.). Additionally or alternatively, some or all of the functions of the virtualization system 106 may be included and distributed among the client device 102 and one or more servers 108 that are connected to the network 104. For example, the client device 102 may include part of the functions of the virtualization system 106 while other functions of the virtualization system 106 may be included in one or more other servers 108. Furthermore, in some embodiments, the virtualization system 106 may be included in one or more third-party servers, e.g., other servers 108, that may or may not be a part of a cloud computing system or architecture.

The client device 102 may be implemented as any of a variety of conventional computing devices including, for example, a mainframe computer, a server, a notebook or portable computer, a handheld device, a netbook, an Internet appliance, a tablet or slate computer, a mobile device (e.g., a mobile phone, a personal digital assistant, a smart phone, etc.), a game console, a set-top box, etc. or a combination thereof.

Additionally or alternatively, the client device 102 may be implemented as any of a variety of conventional consumer devices including, for example, a television, a digital picture frame, an audio player, a video player, an eReader, a digital camera, etc. or a combination thereof. In one embodiment, the virtualization system 106 may be configured to provide networking and computing capabilities for these consumer devices having no or limited networking and computing capabilities.

The network 104 may be a wireless or a wired network, or a combination thereof. The network 104 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof.

In one embodiment, the client device 102 may include one or more processors 110 coupled to memory 112. The memory 112 includes one or more applications or services 114 (e.g., web applications or services, video applications or services, etc.) and other program data 116. The memory 112 may be coupled to, associated with, and/or accessible to other devices, such as network servers, routers, and/or the other servers 108. Additionally or alternatively, in some embodiments, the client device 102 may include an input interface 118 (such as a touch screen, a touch pad, a remote controller, a mouse, a keyboard, a camera, a microphone, etc.) and an output interface 120 (e.g., a screen, a loudspeaker, etc.).

In one embodiment, a user 122 may use the plurality of client devices 102 for home entertainment. The user 122 may read a web page on a mobile phone (e.g., client device 102-1) and note a video on the web page. The user 122 may want to watch the video on a television (e.g., client device 102-2) and use the mobile phone as a remote controller of the television. The user 122 may further want to read textual information of the web page using a tablet (e.g., client device 102-3). The user 122 may perform these operations using the plurality of client devices 102 that include the virtualization systems 106.

Figure 2:
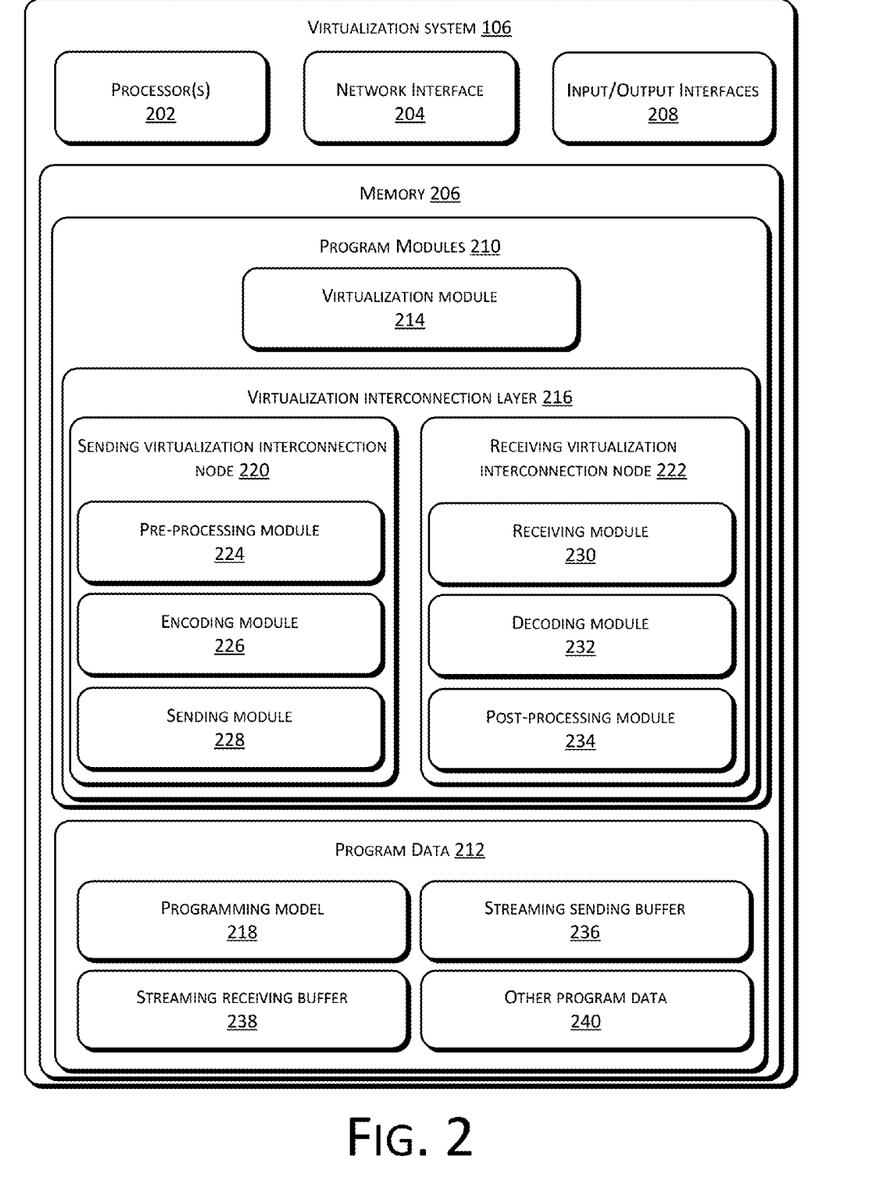
FIG. 2 illustrates the example virtualization system of FIG. 1 in more detail.

FIG. 2 illustrates the virtualization system 106 in more detail. In one embodiment, the virtualization system 106 includes, but is not limited to, one or more processors 202, a network interface 204, memory 206, and an input/output interface 208. The processor(s) 202 is configured to execute instructions received from the network interface 204, received from the input/output interface 208, and/or stored in the memory 206.

The memory 206 may include computer-readable media in the form of volatile memory, such as Random Access Memory (RAM) and/or non-volatile memory, such as read only memory (ROM) or flash RAM. The memory 206 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 206 may include program modules 210 and program data 212. In one embodiment, the virtualization system 106 may include a virtualization module 214. The virtualization module 214 captures inputs and/or outputs of associated client device 102 and/or separates the inputs and/or outputs from the client device 102. Examples of inputs may include, but are not limited to, data captured from a user interface, such as mouse movement and click, keyboard's keystrokes, images from touch surfaces, visual and depth information from cameras or motion sensors, control signals from game controllers, data from accelerometers and/or gyros, data from contextual or ambient sensors, such as location information from GPS (Global Positioning System), WiFi, and other positioning sensors, orientation data from a compass sensor, data from a light sensor, and/or any other possible sensors attached to the client device 102. Examples of the outputs may include, for example, screen contents, audio contents, feedback of haptic devices, and any other results that may be presented to the user 122.

In one embodiment, the virtualization module 214 may generate data virtually inside the client device 102 to obtain virtualized data (e.g., virtualized input (VI) or virtualized output (VO)). For example, the virtualization module 214 may virtually render a screen image with or without displaying the screen image in a local display of the client device 102 and/or pre-process or pre-interpret real input raw data into a high level input signal (e.g., interpreting an image from a touch surface to a high level touch gesture, etc.). Additionally or alternatively, the virtualization module 214 may generate data virtually inside the client device 102 by intercepting physical data directly from a physical device (such as a camera or motion sensor attached to the client device 102) that generates the physical data through a piece of software (e.g., an application programming interface (API) for screen capture, etc.) or a piece of hardware (such as a splitter connected to a display port of the client device 102, for example).

In some embodiments, the virtualization system 106 may further include a virtualization interconnection layer 216. The virtualization interconnection layer 216 may be added and attached to the client device 102 on top of existing data network layers and may serve as a higher-level abstraction layer to interconnect the client device 102 with other client devices 102. The virtualization interconnection layer 216 facilitates data roaming or migration, i.e., moving the virtualized data from the client device 102 that generates the data to one or more other client devices 102.

Due to a large number of different varieties of input and output devices and data types or formats, in one embodiment, the virtualization interconnection layer 216 may be made to be independent of the virtualization module 214 (or the virtualization process that is done by the virtualization module 214). The virtualization system 106 may enable this separation of the virtualization interconnection layer 216 from the virtualization module 214 (or process) by defining a programming model 218 and corresponding application programming interface (API) that is independent of what is performed by the virtualization module 214 (or process). For example, the virtualization system 106 may employ a driver model that may rely on respective software virtualization drivers for corresponding input and output devices.

By separating the virtualization interconnection layer 216 from the virtualization process, the virtualization interconnection layer 216 may be implemented in a dedicated cost effective hardware or a piece of software that provides minimal functions for the data roaming without involving sophisticated computation. Furthermore, this separation enables separating input and output functions from main computing tasks of the applications 114 associated with the client device 102, and thus releases developers of the applications 114 and/or the client device from considering which one or more output devices that the outputs may go to and/or which one or more input devices that the inputs may come from. Moreover, the separation allows the virtualization interconnection layer 216 to interpret or translate data differently for different client devices 102, for example, enabling translation of gestures captured by cameras or motion sensors into mouse signals that are applicable to computer applications.

Depending on application scenarios, the virtualization interconnection layer 216 of the client device 102 may include a sending virtualization interconnection node 220 (which may be referred to as SVIN) and/or a receiving virtualization interconnection node 222 (which may be referred to as RVIN). For example, if only a screen content of a computer is needed to be projected to a television, the computer may only need to have the sending virtualization interconnection node 220 while the television may only need the receiving virtualization interconnection node 222 on the television or a computing device that is attached to the television, for example. Without loss of generality, the virtualization interconnection layer 216 associated with the client device 102 is described hereinafter to have both the sending virtualization interconnection node 220 and the receiving virtualization interconnection node 222.

In one embodiment, the sending virtualization interconnection node 220 may be interfaced with the virtualization module 214, and receive virtualized data (i.e., virtualized input (VI) and/or virtualized output (VO)) from the virtualization module 214. Upon receiving the virtualized data from the virtualization module 214, the sending virtualization interconnection node 220 may pre-process and/or encode the virtualized data, and transmit the processed/encoded virtualized data to one or more other client devices 102 via the network 104. In one embodiment, the sending virtualization interconnection node 220 may include a pre-processing module 224, an encoding module 226 and a sending module 228.

Figure 3:
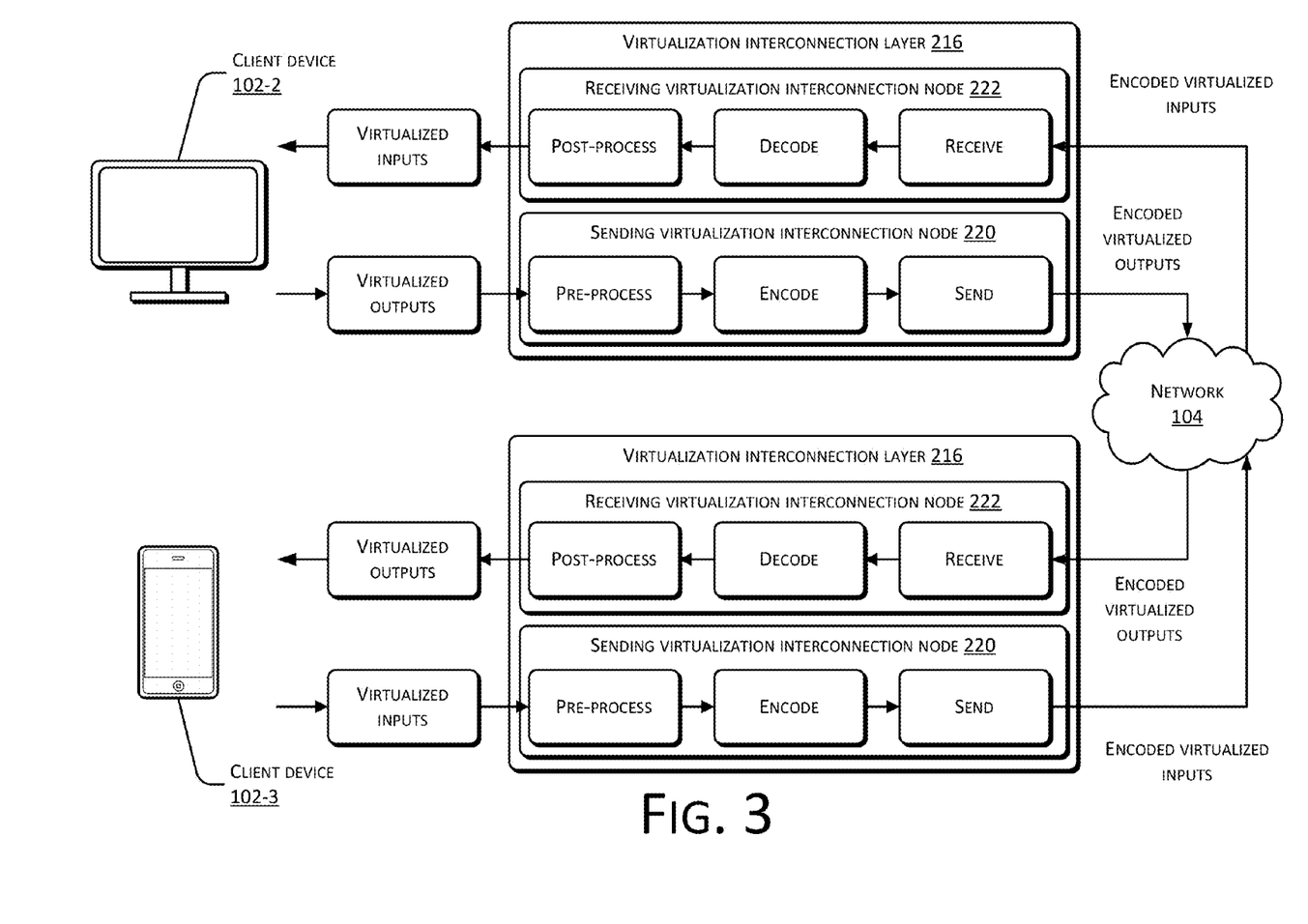
FIG. 3 illustrates data flow between two example client devices in the example home cloud computing system.

On the other hand, the receiving virtualization interconnection node 222 may receive virtualized data from one or more other client devices 102 via the network 104, and decode, reconstruct or process the received virtualized data into a form that is acceptable by a device to which the receiving virtualization interconnection node 222, i.e., the client device 102 in this example. In one embodiment, the receiving virtualization interconnection node 222 may include a receiving module 230, a decoding module 232 and a post-processing module 234. FIG. 3 illustrates data flow between two client devices 102 through respective virtualization interconnection layers 216.

Upon receiving the virtualized data from the virtualization module 214, the sending virtualization interconnection node 220 (or the pre-processing module 224) may pre-process and prepare the virtualized data for further encoding using the pre-processing module 224. The pre-processing module 224 may perform one or more operations on the virtualized data. Examples of the one or more operations include, but are not limited to, analyzing, converting, recognizing, enhancing, filtering, extracting, combining, synchronizing, interpolating, subsampling, cleaning and denoising the virtualized data. For example, the pre-processing module 224 may analyze output content of the virtualized data, such as classifying screen contents into different types (e.g., text regions, image regions, video regions, object regions, etc.). Additionally or alternatively, the pre-processing module 224 may convert raw input data into a format more easily to encode and transmit, such as converting raw images from sensors of a touch surface into high-level gestures, or converting raw depth information from camera or motion sensors into high-level body gestures (such as direction and amount of movement, etc.), etc.

In one embodiment, an extent of data processing performed by the pre-processing module 224 may be determined by one or more factors. For example, the one or more factors may include, but are not limited to, processing power, memory, storage capacity, network bandwidth, flexibility, delay criterion, etc., associated with the client device 102 and/or the virtualization system 106 of the virtualization system 106. Additionally or alternatively, the one or more factors may include relative processing power, memory, storage capacity, network bandwidth, flexibility, delay criterion, etc., between the client device 102 (and/or the virtualization system 106 of the client device 102) and another client device 102 (and/or a virtualization system 106 of the other client device 102) to which the virtualized data is to be sent. For example, if the sending virtualization interconnection node 220 (either embedded or standalone) has very (relatively) limited processing power, the pre-processing module 224 may pass the virtualized data transparently to the encoding module 226, depending on the receiving virtualization interconnection node 222 of the receiving client device 102 to process the virtualized data. Specifically, what to be pre-processed and/or an extent of which the pre-processing to be done by the pre-processing module 224 depend(s) on one or more factors as described above and other system considerations including, for example, a balance between different factors to achieve an overall optimized system performance.

Upon pre-processing the virtualized data, the pre-processing module 224 sends the pre-processed virtualized data to the encoding module 226 for further processing. In one embodiment, the encoding module 226 may further compress and/or encode the pre-processed virtualized data into a compressed virtualized data stream. For example, the encoding module 226 may apply a generic lossless compression algorithm to compress the pre-processed virtualized data to a predetermined level, for example, for sending to the receiving client device 102. In some embodiments, in order to balance a resultant quality and/or data rate of the compressed/encoded virtualized data, the encoding module 226 may apply a content-aware encoding (and/or compression) scheme, i.e., applying different encoding and/or compression algorithms for different types or formats of the virtualized data. Furthermore, in some embodiments, the encoding module 226 may apply different and adaptive encoding and/or compression algorithms based on characteristics of the data at different regions and times even with the same data type. Examples of applications of different encoding or compression algorithms for different types or formats of virtualized data will be described in more detail hereinafter.

After encoding and/or compressing the pre-processed virtualized data, the sending module 228 may transmit or put the compressed virtualized data into the network 104 for other client devices 102 connected to the network 104 to share and utilize. Furthermore, the sending module 228 may serve as a system coordinator to coordinate operations and/or behaviors of the other modules (e.g., the pre-processing module 224 and the encoding module 226) in the virtualization interconnection layer 216 of the client device 102. Additionally or alternatively, the sending module 228 may negotiate with the virtualization interconnection layer 216 of another client device 102. Examples of negotiation may include, but are not limited to, an extent of data transformation (or processing) that the other client device 102 may perform for the client device 102 of the sending module 228 and/or an extent of data transformation (or processing) that the client device 102 of the sending module 228 may perform for the other client device 102, etc.

Additionally or alternatively, the sending module 228 may monitor network conditions of the network 104 including, for example, bandwidth and delay. The sending module 228 may adaptively guide the pre-processing module 224 and the encoding module 226 to adapt to changes in the network conditions and/or changes in capabilities (such as memory, storage, workload, etc.) of the client device 102 and/or one or more client devices 102 that receive the virtualized data stream. In some embodiments, the sending module 228 may encrypt sensitive data included in the compressed virtualized data stream prior to sending the data stream to the network 104.

In one embodiment, the sending module 228 may further broadcast a presence of the client device 102 in a proximity or neighborhood of the client device 102. Additionally or alternatively, the sending module 228 may broadcast the presence of the client device 102 via the network 104. For example, the sending module 228 may send a broadcast message using a network protocol such as Simple Service Discovery Protocol (SSDP) to the network 104, allowing other client devices 102 to discover the presence of the client device 102. Additionally, the sending module 228 may further broadcast one or more capabilities (e.g., abilities to display video and image, play audio, receive user input through a user interface such as a touchscreen, etc.), data qualities (such as display resolution, audio quality, etc.), acceptable data formats and/or types, etc. The sending module 228 may broadcast or advertise the virtualization interconnection layer 216 and/or corresponding client device 102 as a service to other client devices 102 of the same home cloud system or network 104.

Additionally or alternatively, the sending module 228 may detect or discover one or more client devices 102 by receiving a broadcast message from the one or more client devices 102 in a proximity or neighborhood of the client device 102 and/or through the network 104. In some embodiments, depending on content on the client device 102 that the user 122 is currently or actively interacting with, the sending module 228 may adaptively or proactively discover or recommend one or more client devices 102 that may provide a better experience to the user 122 with respect to the content that the user 122 is consuming. For example, if the user 122 is watching a video on the client device 102, the sending module 228 of the client device 102 may detect or determine whether one or more other client devices 102 may be used for providing a better display resolution or size for the video, for example. The sending module 228 may provide a prompt to the user 122 that he/she may switch to watch the video on another client device 102 found.

Additionally or alternatively, in some embodiments, the sending module 228 may further be configured to authenticate and verify one or more client devices 102 that attempt to connect to the client device 102 of the sending module 228 before finally establishing the connections with the one or more client devices 102. Furthermore, in one embodiment, the sending module 228 may encrypt sensitive data present in the virtualized data stream to avoid other unrelated or unauthenticated devices from intercepting or tampering the sensitive data. Moreover, the sending module 228 may support error resilience due to a loss of data (or data packets in the virtualized data stream) during data transmission in the network 104.

Upon discovering, authenticating and/or connecting the one or more other client devices 102, the sending module 228 may switch to real time and low delay transmission of the virtualized data stream from the sending client device 102 to the receiving client device 102. In some embodiments, the sending module 228 may render a low delay (having a predetermined time threshold) as a criterion for smooth and natural user interaction for the user 122. This is because the virtualized data (VI and VO, for example) needs to go through a network layer where a transmission delay may be introduced in addition to delays due to data pre-processing, encoding, decoding and/or post-processing, etc. In order to facilitate provision of a low delay, in one embodiment, a streaming sending buffer 236 and a streaming receiving buffer 238 may be deployed with the sending module 228 and the receiving module 230, respectively.

Additionally or alternatively, the sending module 228 may guide the encoding module 226 to adaptively implement a rate control algorithm according to available channel bandwidth in the network 104. Additionally or alternatively, in some embodiments, the sending module 228 may identify which region and/or object in the virtualized data stream may be the focus of attention of the user 122 (e.g., a button pressed in an application, etc.) and prioritize a sending order of regions and/or objects in the virtualized data stream, having some regions and/or objects having a higher priority to be updated or sent faster or more frequently than others having a lower priority. Additionally or alternatively, the virtualized data and locally rendered data which represents (most) actively changed portions may be combined so that delay for this type of content may no longer be an issue.

In one embodiment, the sending module 228 may further detect and signal to other modules (e.g., the pre-processing module 224 and the encoding module 226 of its associated client device 102 and the other modules of the client device 102 that receives the virtualized data stream, etc.) that a channel error, such as a packet loss or error, has occurred to allow the other modules to take proper actions to recover or compensate for the error at the sending client device 102 or the receiving client device 102.

Since the home cloud system adopts a network based service model, in some embodiments, the home cloud system may not know in advance what kinds of client devices 102 are connected thereto, and/or in what kind of network conditions the home cloud system is connected. In one embodiment, the sending module 228 may facilitate adaptation of one or more services of the client device 102 for one or more other client devices 102 that are connected to the network 104 and the network conditions. By way of example and not limitation, the sending module 228 may perform negotiation with another client device 102 at the time when a connection is established with the other client device 102. Additionally or alternatively, the sending module 228 may perform adaptation with the other client device 102 continuously or regularly when transmitting the virtualized data stream to the other client device 102.

For example, at the time of establishing a connection, the sending module 228 of the client device 102 and the receiving module 230 of another client device 102 may exchange information regarding capabilities (such as screen resolutions, pre-processing/post-processing capabilities, encoding/decoding capabilities, acceptable data types or formats, input or output capabilities, etc.), etc. The sending module 228 may coordinate with other modules (e.g., the pre-processing module 224 and the encoding module 226) in the virtualization interconnection layer 216 to select a suitable configuration to meet the needs of the other client device 102.

After establishing the connection, the sending module 228 of the client device 102 may constantly monitor network conditions (such as network bandwidth, network delay, rate of packet loss, etc.) and data transmission health conditions, etc., within a predetermined time interval. Additionally or alternatively, the sending module 228 may detect changes that may occur in one or more client devices 102 to which the client device 102 of the sending module 228 is connected. Based on the above collected information, the sending module 228 may direct other modules (e.g., the pre-processing module 224 and the encoding module 226) to change one or more operations (e.g., performing additional pre-processing operations, etc.) to adapt to the current situation. For example, if a bandwidth change is detected, the sending module 228 may inform the encoding module 226 to change a bit rate of the virtualized data stream to adapt to this bandwidth change.

In some embodiments, the client device 102 may receive a virtualized data stream from another client device 102 through the virtualization system 106 via the network 104. For example, the client device 102 may receive the virtualized data stream from another client device 102 through the receiving module 230 of the receiving virtualization interconnection node 222 of the virtualization system 106. In one embodiment, the receiving module 230 may perform one or more operations similar to or complementary to the sending module 228. For example, the receiving module 230 may identify or verify identity of the other client device 102 and/or the virtualized data stream, and determine the authenticity of the other client device 102 or a source of the virtualized data stream.

Additionally or alternatively, the receiving module 230 may decrypt a certain part of data included in the received virtualized data stream if the certain part of data is encrypted. Additionally or alternatively, the receiving module 230 may facilitate adaptation of the home cloud computing system in response to changes (e.g., changes in network conditions, capabilities of one or more client devices 102, etc.) by exchanging information regarding capabilities of the client device 102 and other client devices 102 with the sending modules 228 of the other client devices 102.

In one embodiment, after receiving the virtualized data stream and performing one or more operations (such as identity verification, decryption, etc.) on the received virtualized data stream, the receiving module 230 may forward the received virtualized data stream to the decoding module 232 for decoding and/or decompression. In one embodiment, the decoding module 232 may decode and/or decompress the received virtualized data stream in an opposite way that the encoding module 226 of the other client device 102 has done on the received virtualized data stream. For example, as described in the foregoing embodiments, the two client devices 102 (or the virtualization system 106 of the two client devices 102) may have negotiated and established respective responsibilities for data to be transmitted therebetween when a connection between the client devices 102 is established and may renegotiate again after the connection when a change (e.g., changes in capabilities of the client devices, network conditions, etc.). Based on a result of the negotiation, the decoding module 232 may know what encoding and/or compression algorithm the encoding module 226 of the other client device 102 has applied on the received virtualized data stream, and therefore select an appropriate (or an agreed-upon) decoding and/or decompression algorithm to decode and/or decompress the received virtualized data stream.

Upon decoding and/or decompressing the received virtualized data stream, the post-processing module 234 of the receiving virtualization interconnection node 222 of the client device 102 may process the decoded/decompressed virtualized data stream. In one embodiment, the post-processing module 234 may perform the same or similar operations that the pre-processing module 224 may perform. Additionally or alternatively, in some embodiments, the post-processing module 234 may perform other operations including, but not limited to, post-filtering to remove compression artifacts due to lossy compression, for example, error resilience/hiding when data losses or errors occur, interpolation/extrapolation/recovery of data that may have been intentionally dropped at the encoding module 226 of the other client device 102 due to, for example, poor network condition or low processing power, etc.

In one embodiment, the number and/or types of operations to be performed by the post-processing module 234 associated with the client device 102 may depend on the number and/or types of operations that have been done by the pre-processing module 224 associated with the other client device 102. This dependence may be one of the information to be established within the negotiation between the two client devices 102 as described in the foregoing embodiments. For example, in some embodiments, so long as an output from the post-processing module 234 is an acceptable input to the client device 102, how to partition workload or operations between the post-processing module 234 associated with the client device 102 and the pre-processing module 224 associated with the other client device 102 to achieve a modality transformation (or conversion) is flexible. In some embodiments, a partition between workloads (or operations) of two client devices 102 (or virtualization systems associated with the two client devices) may depend on factors, such as compression efficiency, bandwidth, processing capability, power consumption, etc., associated with the two client devices 102. A modality transform refers to a transformation from an input to a pre-processing module 224 associated with one client device 102 to an output to a post-processing module 234 associated with another client device 102.

In one embodiment, the virtualization system 106 may further include other program data 240. The other program data 240 may include log data that records information of one or more other client devices 102 to which the virtualization system 106 of the client device 102 have connected. The record information may include, for example, device identification of the one or more previously connected client devices 102, capabilities (input, output, computing, storage, etc.) of the one or more previously connected client devices 102, etc. Additionally or alternatively, the log data 240 may include information about user preference, for example, which one or more client devices 102 the user 122 most likely or often uses when watching a video, which one or more client devices 102 the user 122 most likely or often uses when reading a text (e.g., a web page), etc. Additionally or alternatively, the log data may include information about which one or more client devices 102 are most often or likely used by the user 122 during a particular time period.

In one embodiment, the virtualization system 106 may employ this information to establish connections among these client devices 102 beforehand while leaving other client devices 102 in a waiting or disconnected state for connection to avoid the client device 102 from establishing too many network connections with other client devices 102 that are not needed and hence saving the resources of the client device 102 from wasting. Additionally or alternatively, the virtualization system 106 may use the log data to re-establish and/or authenticate future connections and data communication with other previously connected client devices 102.

Exemplary Programming Model

In one embodiment, the home cloud computing system may further provide a unified programming model. The programming model may allow developers of software applications (e.g., the applications 114, etc.) and/or the client devices 102 to build applications that may be adapted to other output (e.g., display) and/or input (e.g., user interface (UI)) devices (e.g., personal computers, televisions, slate computers, mobile devices, etc.), which separate functionality of user interaction from main computing functions. The programming model may automatically or semi-automatically (i.e., with human intervention or input) determine a way for user interaction (both inputs and outputs) adaptation.

Given the virtualization interconnection layer 216, inputs and outputs of associated client device 102 may be arbitrarily redirected to another client device 102 as if the inputs and the outputs are physically attached or connected to the other client device 102. Given the programming model and the virtualization interconnection layer 216, existing applications in the client device 102 may not need to be updated for this redirection and the virtualization interconnection layer 216 may be responsible for converting one mode (or type, format, version, etc.) of virtualized input or output to another mode (or type, format, version, etc.) that may be acceptable to the other client device 102. For example, a touch input on a slate computer may be converted into a mouse input for a desktop computer, while a screen output of a desktop computer may be scaled to be displayed in a screen of a mobile device, etc.

Furthermore, given the programming model, new applications may have more flexibility to aggregate new input and/or output capabilities that may or may not be physically attached or connected to a computing or client device 102. The home cloud computing system leverage natural UI devices such as touch, Kinect®, camera on one or more client devices 102 to control behaviors and/or operations of one or more other client devices 102 and/or new applications on the one or more other client devices 102. Additionally or alternatively, the home cloud computing system may leverage rendering, processing and/or other computing operations or resources on multiple client devices 102, and combine inputs and/or outputs of these client devices with input and/or output of another client device 102 to form a computing platform for special applications. For example, a delay sensitive object (e.g., a graphical UI button, a fillable form, a pull-down menu, a foreground active game character, etc.) may be rendered on a client device 102 locally, while computationally intensive but delay tolerant tasks may be offloaded to other computing or client devices 102. The other client devices 102 may then pass back (only) outputs or results of these computationally intensive but delay tolerant tasks to the client device 102 in which the delay sensitive object is locally rendered to form a final result for display to the user 122. No additional hardware and/or software other than the virtualization interconnection layer 216 may be needed for these operations.

Although the foregoing embodiments describe a home computing environment, the foregoing embodiments may be readily applicable to cloud computing and mobile computing. For example, if the user 122 moves outside his/her home, the user 122 may still enjoy the benefits of the home cloud computing system with his/her mobile device and cloud devices as the plurality of client devices 102 of the home cloud computing system.

Exemplary Data Encoding Algorithms

As described in the foregoing embodiments, the encoding module 226 may apply different encoding or compression algorithms for different types or formats of data in the virtualized data forwarded by the pre-processing module 224. By way of example and not limitation, three encoding/compression algorithms for different types of data, namely, frame-based screen data encoding, object-based screen data encoding and UI control data encoding, are described herein. It should be noted however that these encoding/compression algorithms are described herein for illustration purpose. The present disclosure is not limited to these encoding/compression algorithms and these types of data.

In one embodiment, the virtualized (captured) screen from the client device 102 may be represented as a sequence of display images organized in a temporal order. The virtualized screen may include pictorial, graphical and textual contents that may be different from normal/natural video. In one embodiment, the encoding module 226 may employ a specific screen codec for frame-based screen coding. An example of the specific screen codec is described in the U.S. Pat. No. 8,180,165, issued on May 15, 2012, titled "Accelerated Screen Codec", the entirety of which is incorporated by reference herein. Additionally, in some screen virtualization scenarios, the encoding module 226 may obtain additional information besides a time series of frame-based screen images. For example, given an OS (operating system) or application support, such as objects in a web browser application that may be obtained through parsing a web page, the encoding module 226 may obtain original compressed bitstreams of image or video objects. In this scenario, the encoding module 226 may simply redirect the original compressed bitstreams of the screen (image or video) objects to a receiving client device 102 that receives the virtualized data stream, instead of compressing the sequence of frame-based screen images. In this case, the virtualized screen may be a composition of the sequence of frame-based images and/or image and video objects. Furthermore, in an event that the receiving client device 102 has a display that is able to display part of the virtualized screen, the encoding module 226 may only encode or compress the part to be displayed and send the encoded part to the receiving client device 102 through the sending module 228 in order to save both computing power and network bandwidth.

Additionally or alternatively, in some embodiments, the encoding module 226 may decompose virtualized screen data into objects for predetermined screen types, i.e., applying object-based screen data encoding. For example, for virtualized display of some specific applications such as a web browser application, an entire web page may be rendered as an image with object and metadata information at the sending client device 102. The encoding module 226 may encode web regions that are visible on a display of the receiving client device 102. In one embodiment, the decomposed screen data may include, for example, object metadata, redirectable media objects, unredirectable media objects and background image data, etc. The object metadata include object information, such as hyperlink, input text box, etc. The encoding module 226 may encode object type, position and/or shape, for example, using conventional lossless coding scheme such as ZIP coding scheme.

The redirectable media objects correspond to media objects that may be handled by the receiving client device 102 (or the virtualization system 106 of the receiving client device 102). The redirectable media objects may include, for example, GIF animations, video objects with specific formats, etc.) By redirecting these redirectable media objects to the receiving client device 102, repeated encoding and transmission of the redirectable media objects may be avoided, thus improving bandwidth usage and transmission delay.

The unredirectable media objects correspond to media objects that may be extracted from a web browser engine and may be handled (or decoded) by the receiving client device 102 (or the virtualization system 106 of the receiving client device 102). In this case, the encoding module 226 may transcode these media objects into a media format that is accepted or supported by the receiving client device 102. For example, if the receiving client device 102 supports WMV (Windows Media Video) format but not Flash format, the encoding module 226 may transcode the Flash formatted video into the WMV formatted video before sending the video to the receiving client device 102.

The background image data correspond to the remaining content on the rendered web page that may be taken as a time series of background images. The background image data may include dynamically changed regions, e.g., an unextractable video or animation. The encoding module 226 may apply a specific screen codec (e.g., the screen codec that is described in the above-referenced US patent) to encode or compress the background image data. Furthermore, in order to improve a compression ratio, a buffer may be deployed at or with the encoding module 226 of the sending client device 102 and another buffer at or with the decoding module 232 of the receiving client device 102 to cache or store the background image data. For encoding visible regions of a current web page that are to be sent to the receiving client device 102, the encoding module 226 may compute differences between the visible regions of the current web page and corresponding regions that are cached or stored in the buffer, for example, in terms of temporal and/or spatial predictions. The encoding module 226 may encode only the differences which may then be sent to the receiving client device 102.

In some embodiments, the encoding module 226 may encode the redirectable media objects as background image using the same screen codec as described in the referenced US patent. For example, if only a small part of a picture having a high resolution in a web page or a downsized portion thereof is to be shown in a display of the receiving client device 102, the encoding module 226 may re-encode the picture as a part of the background image data and redirect a full resolution image to the receiving client device 102 (or the virtualization system 106 of the receiving client device 102). Depending on specific situations of the home cloud computing system and/or current screen content, the encoding module 226 may flexibly adapt to different situations to select and provide an efficient composition and compression scheme to improve the performance of the home cloud computing system.

In general, the object-based web page image coding scheme as described above is extendable to encode virtualized data streams from other applications if, for example, similar metadata and data objects can be extracted from their virtualized data and associated side information. Using the object-based screen data coding, new features including, for example, data object redirection, mixed composition, UI customization, enabled object caching and selective transmission, etc., may be obtained. In one embodiment, the data object redirection is referred to as capturing certain virtualized data objects in a compressed format, directly passing the captured objects to the virtualization interconnection layer 216 of the receiving client device 102, and decoding or rendering the captured objects in the receiving client device 102 based on its native acceptable data format.

The mixed composition feature corresponds to mixing locally captured or rendered data objects in a client device 102 with virtualized data objects from another client device 102 to form or compose a final data input or output for one or more client devices 102 (e.g., the client device 102 where the data objects are locally captured or rendered). This may avoid a round trip delay to respond to certain user interactions otherwise needed in a completely virtualized (remote) solution, e.g., text input box, graphical control button, pull down menu, etc. Furthermore, the mixed composition feature provides a flexible solution for both local and remote client devices 102 to collaborate for delivery of better user experience through mixed inputs or mixed outputs.

The UI customization corresponds to flexible combination of virtualized UI control modalities, e.g., game controller, keyboard, mouse, Kinect®, touch surface, voice, audio and video, etc., to fit specific user scenarios. Moreover, within each modality, UI control data objects (e.g., extracted gesture data from Kinect® data) may be extracted from part or all of the virtualized data, and sent to the virtualization interconnection layer 216 of the receiving client device 102 either alone or along with virtualized raw or compressed data (e.g., virtualized raw or compressed Kinect® data). Furthermore, the object-based screen data coding may enable prioritized processing, encoding and transmission of regions or objects (such as UI control, for example) that have stringent latency requirements from the sending client device 102 to the receiving client device 102.

Additionally, by using the buffer at or with the encoding module 226 and the decoding module 232, repeated objects may be cached for reuse and/or manipulation in the receiving client device 102 without re-transmission. Furthermore, the encoding module 226 may selectively encode (only) relevant data objects for sending to the receiving client device 102 through the sending module 228.

In some embodiments, because of virtualization of input data that is put in the virtualization interconnection layer 216 of the virtualization system 106, different UI modalities on the plurality of client devices 102 may be shared and leveraged for enhanced user experience. For human-computer interaction, a variety of types of UI and sensor input data may be generated. These UI and sensor data may be transferred from one client device 102 to another client device 102 and vice versa through respectively virtualization interconnection layers 216 to bring new UI controls without locally attaching the UI controls to the client devices 102. For example, touch control data of a client device 102 (e.g., a mobile phone) may be transferred to another client device 102 (e.g., a tablet) to control the latter. On the other hand, gesture control data generated from a Kinect® camera that is attached to a client device 102 (e.g., Xbox®) may also be delivered to another client device 102 (e.g., a desktop computer) to control an application in the other client device 102.

Depending on a transfer rate for transferring UI/sensor input data from one client device 102 to another client device 102, the UI/sensor input data may be divided into a plurality of categories. By way of example and not limitation, a first category may include a low-rate raw input data with raw data rate generated by a corresponding UI device or sensor is less than a first predetermined rate threshold. These raw data may be directly interpreted by a client device 102. Examples of UI devices or sensors may include, for example, a keyboard, a mouse, a joystick, a game controller, etc. Although the bit rate for this type of raw data is low, this type of data is normally sensitive to errors or losses which may cause the client device 102 to behave differently. For this type of data, the encoding module 226 may transmit the raw data uncompressed if a corresponding bit rate is less than a predetermined threshold or use a simple or generic lossless compression algorithm (such as ZIP or LZW algorithm) to compress the raw data before sending if an extra but rate saving is desirable at a system level.

A second category may include moderate-to-high-rate (i.e., data rate is between the first rate threshold and a second rate threshold, for example) raw input data which may become low-rate processed data after pre-processing by the pre-processing module 224 at the sending client device 102. Examples of this second type of raw data include, but are not limited to, two-dimensional images from a touch surface, audio input data, visual data from a camera, visual and depth information from a Kinect® sensor, time series of data from an accelerometer and/or a gyroscope; data from a contextual or ambient sensor, such as satellite data received by GPS, orientation data from a compass sensor, data from a light sensor, and other possible sensors attached to the client device 102.

Although its raw data rate is moderate to high, in many cases, these raw data may be first pre-processed by the pre-processing module 224 or the client device 102 to which corresponding UI/sensor devices are attached, through hardware or software solutions. In some cases, the pre-processing functions may be collocated with the UI/sensor devices for improved efficiency. After the pre-processing, the processed data rate may be significantly reduced, for example, from raw 2D images to high level touch gestures, from raw Kinect® visual and depth data to body gestures, from audio input to recognized texts or commands, from visual data to identified object/extracted features, from received satellite data to location coordinates, etc. This kind of processed data becomes high-level UI inputs which have low data rate but are more sensitive to errors or losses. In one embodiment, the encoding module 226 may transmit the raw data uncompressed if a corresponding bit rate is less than a predetermined threshold or use a simple or generic lossless compression algorithm (such as ZIP or LZW algorithm) to compress the raw data before sending if an extra but rate saving is desirable at a system level.

A third category may include raw input data that have moderate to high data rate generated by NUI or sensor devices, and the sending client device 102 does not have enough pre-processing capabilities or the raw data need to be sent to the receiving client device 102 for further data processing or manipulation. In one embodiment, the encoding module 226 need to compress this type or kind of raw input data to a much lower data rate than its original raw data rate to fit into the network 104 for making the home cloud computing system feasible. Furthermore, the encoding module 226 may select a compression algorithm for this kind of raw input data based on one or more other factors such as a low latency criterion for enabling a natural and smooth user experience. Depending on the nature and/or characteristics of the raw input data, the encoding module 226 may select a compression algorithm that may be specific to the data type of the raw input data. In some embodiments, the encoding module 226 may select a lossy compression algorithm in order to achieve a desired data compression ratio for this kind of raw input data, while enabling high-level UI controls that are extracted at the receiving client device 102 as close to those that are extracted at the sending client device 102 locally as much as possible. For example, the encoding module 226 may select and employ compression algorithms or schemes that are tuned to respective data characteristics of the raw input data having a low latency criterion. For example, for data types such as voice, audio, image and video, the encoding module 226 may apply existing standard coding schemes to compress them, e.g., MPS for audio data, H.264 for video data, JPEG for image data, etc.

Exemplary Methods

Figure 4:
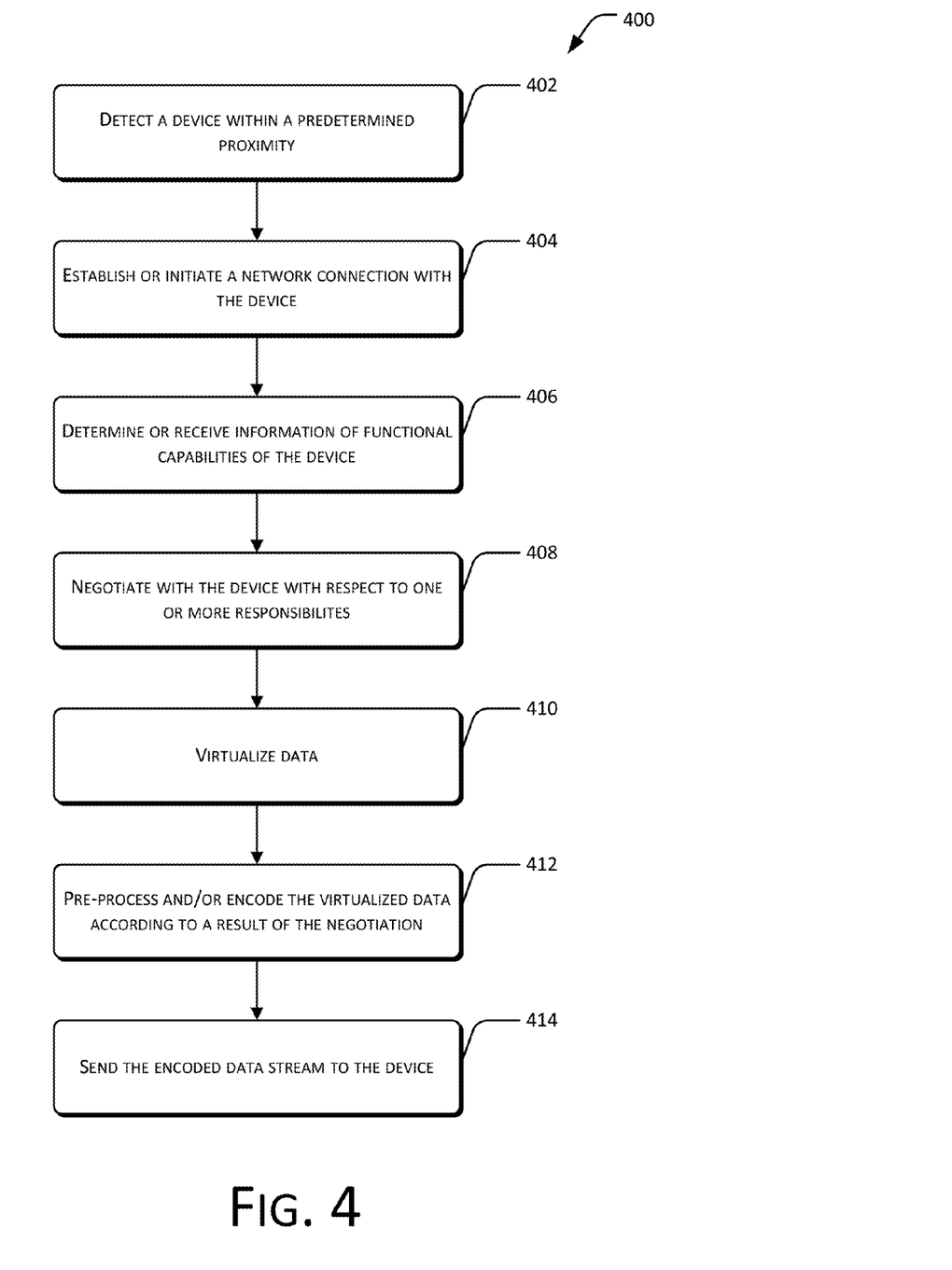
FIG. 4 illustrates an example method of data virtualization and resource leveraging.

FIG. 4 is a flow chart depicting an example method 400 of data virtualization and resource leveraging. The method of FIG. 4 may, but need not, be implemented in the environment of FIG. 1 and using the system of FIG. 2. For ease of explanation, method 400 is described with reference to FIGS. 1 and 2. However, the method 400 may alternatively be implemented in other environments and/or using other systems.

Method 400 is described in the general context of computer-executable instructions. Generally, computer-executable instructions can include routines, programs, objects, components, data structures, procedures, modules, functions, and the like that perform particular functions or implement particular abstract data types. The method can also be practiced in a distributed computing environment where functions are performed by remote processing devices that are linked through a communication network. In a distributed computing environment, computer-executable instructions may be located in local and/or remote computer storage media, including memory storage devices.

The exemplary method is illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 4, at block 402, a first device 102 (equipped with a virtualization system 106) detects a presence of a second device 102 in a proximity or neighborhood of the first device.

At block 404, the virtualization system 106 of the first device 102 establishes or initiates a network connection with the virtualization system 106 of the second device 102.

At block 406, the virtualization system 106 of the first device 102 determines or receives information of functional capabilities of the second device 102.

At block 408, the virtualization system 106 of the first device 102 negotiates with the virtualization system 106 of the second device 102 with respect to one or more responsibilities on data communicated therebetween. For example, the virtualization system 106 of the first device 102 negotiates with the virtualization system 106 of the second device 102 on an extent of data transformation to be performed by the first device 102 for the second device 102 and an extent of data transformation to be performed by the second device for the first device 102 based on the functional capabilities of the second device 102 and functional capabilities of the first device 102.

At block 410, the virtualization system 106 of the first device 102 virtualizes of the first device 102 as virtualized data. In one embodiment, the virtualization system 106 of the first device 102 virtualizes the data of the first device 102 by generating output data at the first device 102 without locally presenting the output data in a display of the first device 102 and/or capturing input data through a user interface of the first device 102 without locally processing the input data at the first device 102.

At block 412, the virtualization system 106 of the first device 102 transforms the virtualized data into a virtualized data stream in a virtualization interconnection layer based on a result of the negotiation between the first device 102 and the second device 102. In one embodiment, the virtualization system 106 of the first device 102 may pre-process the virtualized data to a predetermined extent that has been agreed upon between the first device 102 and the second device 102 based on the result of the negotiation. Additionally or alternatively, the virtualization system 106 of the first device 102 may encode the pre-processed virtualized data using different algorithms for different types of data included in the virtualized data.

At block 414, the virtualization system 106 of the first device 102 sends the compressed or encoded virtualized data stream from the first device 102 to the second device 102 to leverage resources of the first device 102 and the second device 102.

Although the above acts are described to be performed by the virtualization system 106, one or more acts that are performed by the virtualization system 106 may be performed by the client device 102 or other software or hardware of the client device 102 and/or any other computing device (e.g., the server 108). For example, a sending client device 102 may virtualize data thereof and send the virtualized data to the server 108 via the network 104. The server 108 may pre-process and encode the virtualized data based on a data type or format that is acceptable to a receiving client device 102 (a client device 102 that receives the virtualized data), and send the processed and encoded virtualized data to the receiving client device 102. The sending client device 102 and/or the server 108 may constantly monitor network conditions and/or computing conditions of the receiving client device 102, and perform adaptation to data pre-processing and data transmission accordingly in response to detecting or determining that a change in the network conditions and/or computing conditions of the receiving client device 102 occurs.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

Conclusion

Although embodiments have been described in language specific to structural features and/or methodological acts, it is to be understood that the claims are not necessarily limited to the specific features or acts described. Rather, the specific features and acts are disclosed as exemplary forms of implementing the claimed subject matter.

What is claimed is:

1. One or more computer-readable media storing computer-executable instructions that, when executed by one or more processors, configure the one or more processors to perform acts comprising:

detecting, by a first device, a presence of a second device in a proximity of the first device;

establishing, by the first device, a network connection between the first device and the second device, the establishing comprising:

determining functional capabilities of the second device; and negotiating by the first device an extent of data transformation to be performed by the first device for the second device and an extent of data transformation to be performed by the second device for the first device based on the functional capabilities of the second device and functional capabilities of the first device; and virtualizing data of the first device into virtualized data, the virtualizing comprising:

generating output data at the first device without locally presenting the output data on a display of the first device; and transforming the virtualized data into a virtualized data stream in a virtualization interconnection layer on top of a data network layer associated with the first device based on a result of the negotiating, the transforming comprising:

pre-processing the virtualized data to an extent agreed upon between the first device and the second device based on the result of the negotiating;

encoding the pre-processed virtualized data using different algorithms for different types of data included in the virtualized data; and sending the virtualized data stream from the first device to the second device.

2. The one or more computer-readable media as recited in claim 1, the acts further comprising:

detecting a change in at least one of the functional capabilities of the first device or the second device; and in response to detecting the change, re-negotiating the extent of the data transformation to be performed by the first device for the second device and the extent of the data transformation to be performed by the second device for the first device based on the change.

3. A system comprising:

one or more processors; and memory storing executable instructions that, when executed by the one or more processors, configure the one or more processors to perform acts comprising:

detecting, by a first device, a presence of a second device in a proximity of the first device;

establishing, by the first device, a network connection between the first device and the second device, the establishing comprising:

determining functional capabilities of the second device; and negotiating between the first device and the second device an extent of data transformation to be performed by the first device for the second device and an extent of data transformation to be performed by the second device for the first device based on the functional capabilities of the second device and functional capabilities of the first device;

virtualizing data of the first device into virtualized data, the virtualizing including:

capturing input data through a user interface of the first device without locally processing the input data at the first device; and generating output data at the first device without presenting the output data on a display of the first device;

transforming the virtualized data into a virtualized data stream based on a result of the negotiating; and sending the virtualized data stream from the first device to the second device.

4. The system as recited in claim 3, the acts further comprising at least one of:

broadcasting information of one or more services that the first device is able to provide; or receiving information of one or more services that the second device is able to provide.

5. The system as recited in claim 3, wherein the transforming comprises pre-processing the virtualized data to an extent agreed upon between the first device and the second device based on the result of the negotiating.

6. The system as recited in claim 3, wherein the transforming comprises encoding the pre-processed virtualized data using different algorithms for different types of data included in the virtualized data.

7. The system as recited in claim 3, the acts further comprising:

receiving other virtualized data from a third device;

extracting input data from the other virtualized data of the third device; and combining the extracted input data with input data received from the user via a user interface of the first device to form a combined input.

8. The system as recited in claim 7, the acts further comprising at least one of:

presenting an output on the display of the first device based on the combined input; or forwarding the combined input to a fourth device.

9. The system as recited in claim 3, the acts further comprising:

receiving other virtualized data from a third device;

extracting output data from the other virtualized data of the third device;

combining the extracted output data with output data of the first device to form a combined output; and presenting the combined output on the display of the first device.

10. A method comprising:

under control of one or more processors configured with executable instructions:

virtualizing data of a first device into virtualized data by capturing the data of the first device from a user interface of the first device without processing the data at the first device;

transforming the virtualized data into a virtualized data stream for a second device, the transforming comprising adapting the data of the first device to a format that has been agreed upon between the first device and the second device;

sending the virtualized data stream to the second device;

discovering a presence of a third device in the proximity of the first device;

establishing by the first device a network connection between the first device and the third device; and determining one or more capabilities of the third device to receive, process, and/or display the virtualized data stream, the one or more capabilities comprising input capability, data processing power and/or display resolution.

11. The method as recited in claim 10, further comprising adding a virtualization interconnection layer on top of a data network layer associated with the first device, the virtualization interconnection layer enabling virtualization of the data of the first device and adaptation of a new device to connect to the first device for at least one of receiving data of the new device or sending the data of the first device.

12. The method as recited in claim 10, wherein the virtualizing comprises generating the data of the first device without presenting the data locally at the first device.

13. The method as recited in claim 10, further comprising decoupling the data of the first device from the first device, and the sending comprising sending the virtualized data stream to the second device for presentation and processing.

14. The method as recited in claim 10, wherein the data of the first device comprises input data received from a user interface at the first device, and wherein the method further comprises:

receiving another virtualized data stream from the third device, the other virtualized data stream comprising input data received from a user interface at the third device; and combining the input data of the first device and the input data of the third device into a combined input.

15. The method as recited in claim 10, wherein the data of the first device comprises output data produced by the first device, and wherein the method further comprises:

receiving another virtualized data stream from the third device, the other virtualized data stream comprising output data produced by the third device; and combining the output data of the first device and the output data of the third device into a combined output.

16. The method as recited in claim 10, further comprising broadcasting in the proximity of the first device one or more services that the first device is able to offer.

17. The method as recited in claim 10, further comprising:

detecting a change in a functional capability of the first device and/or a functional capability of the second device; and in response to detecting the change, re-negotiating an extent of data transformation to be performed by the first device for the second device and an extent of data transformation to be performed by the second device for the first device based on the change.

18. The method as recited in claim 10, wherein the transforming comprises encoding the pre-processed virtualized data using different algorithms for different types of data included in the virtualized data.

* * * * *